(12) United States Patent
Okamoto et al.

(10) Patent No.: US 8,026,947 B2
(45) Date of Patent: Sep. 27, 2011

(54) IMAGE SENSOR

(75) Inventors: Daisuke Okamoto, Daito (JP); Hisao Kai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 534 days.

(21) Appl. No.: 12/247,557

(22) Filed: Oct. 8, 2008

(65) Prior Publication Data

US 2009/0091632 A1 Apr. 9, 2009

(30) Foreign Application Priority Data

Oct. 9, 2007 (JP) ................................ 2007-262929

(51) Int. Cl.
H04N 5/228 (2006.01)
H04N 5/225 (2006.01)
G03B 17/00 (2006.01)

(52) U.S. Cl. .................. 348/208.2; 396/52; 348/374

(58) Field of Classification Search ............ 348/208.99, 348/208.2, 208.7, 373–376; 396/52–55
See application file for complete search history.

(56) References Cited

U.S. PATENT DOCUMENTS

| | | | | |
|---|---|---|---|---|
| 5,581,412 A | * | 12/1996 | Tanaka | 359/697 |
| 5,606,384 A | * | 2/1997 | Yamazaki et al. | 396/55 |
| RE38,308 E | * | 11/2003 | Ito | 359/700 |
| 6,985,176 B2 | * | 1/2006 | Noguchi | 348/208.11 |
| 7,586,519 B2 | * | 9/2009 | Nomura et al. | 348/208.4 |
| 7,860,383 B2 | * | 12/2010 | Nomura et al. | 396/55 |
| 2001/0026686 A1 | * | 10/2001 | Ito | 396/440 |
| 2001/0055073 A1 | * | 12/2001 | Shinomiya | 348/374 |
| 2004/0021792 A1 | * | 2/2004 | Yasui | 348/373 |
| 2007/0126923 A1 | * | 6/2007 | Shinomiya | 348/374 |
| 2007/0182824 A1 | * | 8/2007 | Nomura et al. | 348/208.99 |
| 2008/0055421 A1 | * | 3/2008 | Kimura | 348/208.99 |

FOREIGN PATENT DOCUMENTS

| | | | | |
|---|---|---|---|---|
| JP | 63011888 A | * | 1/1988 | |
| JP | 06241830 A | * | 9/1994 | |
| JP | 07081183 A | * | 3/1995 | |
| JP | 2001-133564 A | | 5/2001 | |
| JP | 2001332819 A | * | 11/2001 | |
| JP | 2006-71825 A | | 3/2006 | |
| JP | 2006071825 A | * | 3/2006 | |
| JP | 2007-10934 A | | 1/2007 | |
| WO | WO 2008096642 A1 | * | 8/2008 | |

* cited by examiner

*Primary Examiner* — Timothy J Henn
(74) *Attorney, Agent, or Firm* — Crowell & Moring LLP

(57) ABSTRACT

This image sensor includes a flexible wiring board connected with an optical sensor, bent around the portion connected with the optical sensor and so formed as to generate urging force oppositely to the bent direction and a support portion having a first support surface supporting the optical sensor. The optical sensor is urged toward the first support surface of the support portion to be fixed thereto due to the urging force of the flexible wiring board arranged in the bent manner.

18 Claims, 13 Drawing Sheets

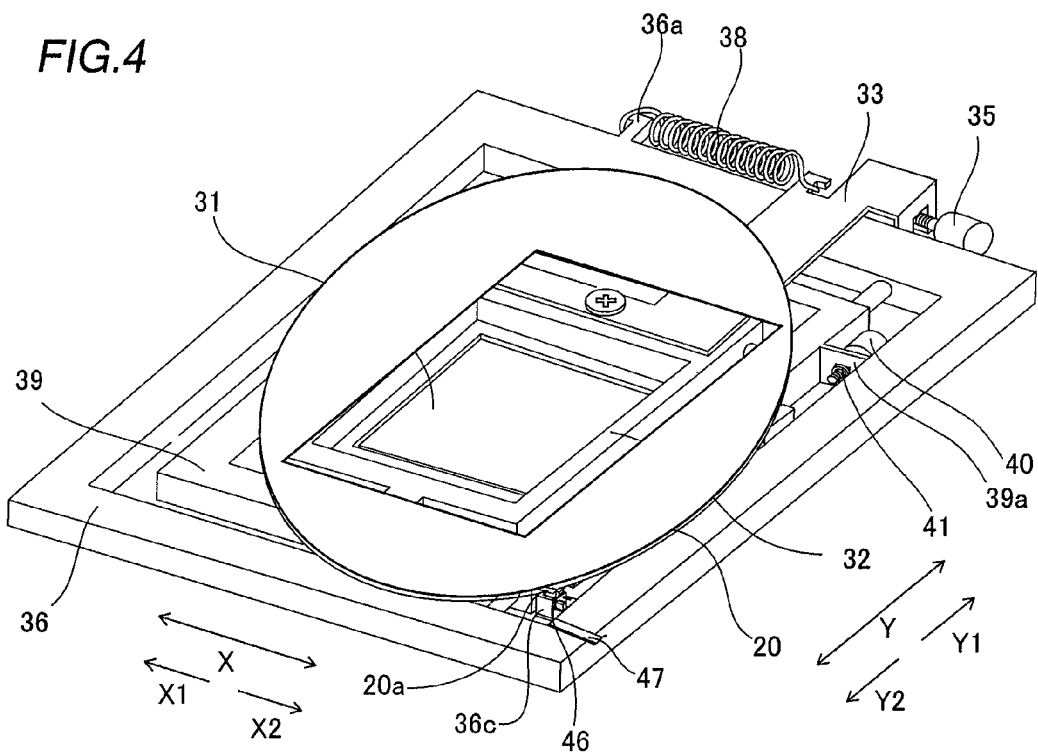
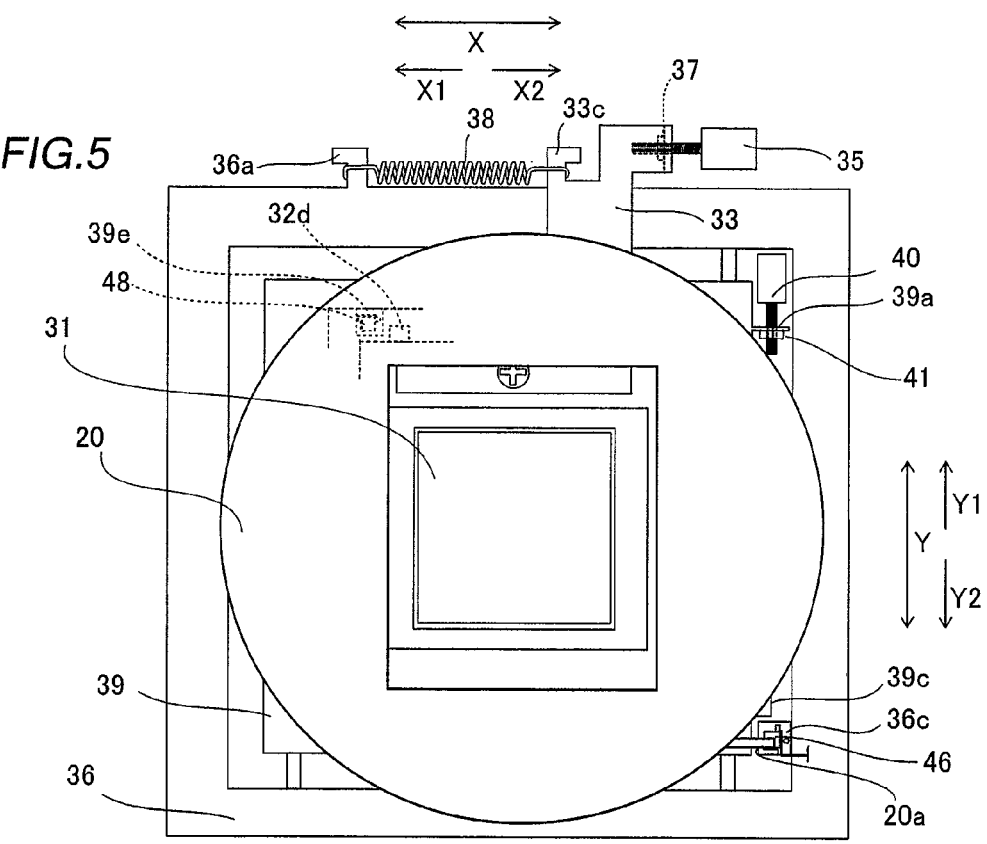

IMAGE SENSOR

BACKGROUND OF THE INVENTION

1. Field of the Invention

The present invention relates to an image sensor, and more particularly, it relates to an image sensor comprising an optical sensor and a support portion supporting the optical sensor.

2. Description of the Background Art

An image sensor comprising an optical sensor and a support portion supporting the optical sensor is known in general, as disclosed in each of Japanese Patent Laying-Open Nos. 2007-10934, 2001-133564 and 2006-71825, for example.

The aforementioned Japanese Patent Laying-Open No. 2007-10934 discloses a camera module comprising a photointerrupter (optical sensor) detecting the origin of a lens-barrel, a PI (photointerrupter) extracting board for supplying power to the photointerrupter, a base plate (support portion) receiving the photointerrupter thereby supporting all surfaces of the photointerrupter except the upper surface and a PI holder fixed to the base plate with positioning pins for coming into contact with the upper surface of the photointerrupter thereby fixing the photointerrupter to the base plate.

The aforementioned Japanese Patent Laying-Open No. 2001-133564 discloses an electronic apparatus comprising a transmission photointerrupter (optical sensor) detecting a rotational position of a driven member (movable portion), a base plate (support portion) including a positioning projecting portion fitted with the transmission photointerrupter for supporting the transmission photointerrupter from above and a circuit board supporting the transmission photointerrupter from below through an external electrode. The external electrode of this electronic apparatus is provided on the circuit board, in order to supply power to the transmission photointerrupter. The circuit board is fixed to the base plate with circuit board fixing screws. Thus, the transmission photointerrupter is so formed as not to separate from the external electrode, and fixed to be held between the base plate and the circuit board.

The aforementioned Japanese Patent Laying-Open No. 2006-71825 discloses a sensor arrangement structure for a drive module comprising the drive module including a lens-barrel, a photointerrupter (optical sensor) for detecting the position of the origin of the lens-barrel and a gear support (support portion) including a sensor arrangement portion fitted with the optical sensor for supporting a gear driving the lens-barrel. The photointerrupter of this sensor arrangement structure is fixed to the gear support with an adhesive.

In the camera module described in the aforementioned Japanese Patent Laying-Open No. 2007-10934, however, the PI holder and the positioning pins are required in order to fix the photointerrupter (PI) to the base plate (support portion), and hence the number of components is disadvantageously increased.

In the electronic apparatus described in the aforementioned Japanese Patent Laying-Open No. 2001-133564, the circuit board fixing screws for fixing the circuit board to the base plate are required in order to hold the transmission photointerrupter between the base plate (support portion) and the circuit board for fixing the same. Therefore, the number of components is disadvantageously increased.

In the sensor arrangement structure for a drive module described in the aforementioned Japanese Patent Laying-Open No. 2006-71825, the adhesive must be employed for fixing the photointerrupter to the sensor arrangement portion of the gear support (support portion), and hence the operation for fixing the photointerrupter is disadvantageously complicated.

SUMMARY OF THE INVENTION

The present invention has been proposed in order to solve the aforementioned problems, and an object of the present invention is to provide an image sensor capable of suppressing complication of an operation for fixing an optical sensor to a support portion while suppressing increase in the number of components for fixing the optical sensor to the support portion.

An image sensor according to a first aspect of the present invention comprises an optical sensor, a flexible wiring board, having a sensor connecting portion connected with the optical sensor while supplying power to the optical sensor, bent around the sensor connecting portion and so formed as to generate urging force oppositely to the bent direction on the sensor connecting portion and a support portion at least having a first support surface for supporting the optical sensor, and the optical sensor is urged at least toward the first support surface of the support portion to be fixed thereto due to the urging force of the flexible wiring board arranged in the bent manner.

As hereinabove described, the image sensor according to the first aspect is provided with the flexible wiring board bent around the sensor connecting portion connected with the optical sensor and so formed as to generate the urging force oppositely to the bent direction on the sensor connecting portion and the support portion at least having the first support surface supporting the optical sensor while the optical sensor is urged at least toward the first support surface of the support portion to be fixed thereto due to the urging force of the sensor connection portion of the flexible wiring board arranged in the bent manner, whereby the optical sensor is urged toward the first support surface of the support portion and fixed thereto due to the urging force generated by bending the flexible wiring board around the sensor connecting portion. Thus, no additional component may be provided for merely fixing the optical sensor to the support portion, whereby increase in the number of components for fixing the optical sensor to the support portion can be suppressed. Further, the optical sensor is fixed to the first support surface of the support portion due to the urging force generated by bending the flexible wiring board around the sensor connecting portion, whereby the optical sensor can be fixed to the support portion by simply bending the flexible wiring board having the sensor connecting portion connected with the optical sensor around the sensor connecting portion and arranging the flexible wiring board so that the optical sensor comes into contact with the first support surface of the support portion. Thus, complication in the operation for fixing the optical sensor to the support portion can be suppressed as compared with a case of fixing the optical sensor to the support portion with an adhesive.

In the aforementioned image sensor according to the first aspect, the support portion preferably further includes a second support surface orthogonal to the first support surface, and the optical sensor is preferably urged not only in the direction of the first support surface but also in the direction of the second support surface due to the urging force of the sensor connecting portion of the flexible wiring board. According to this structure, the optical sensor is fixed not only to the first support surface but also to the second support surface orthogonal to the first support surface due to the urging force resulting the sensor connecting portion of the flexible wiring board. Thus, the optical sensor can be more stably fixed to the support portion.

In this case, the support portion preferably further includes a third support surface orthogonal to the first support surface and the second support surface, the image sensor preferably further comprises an imaging element imaging a subject, a sensor body including the imaging element, a shaking correction portion for sensing shaking of the sensor body and correcting the shaking, a lens for incorporating light from the direction of the subject and a lens cover arranged between the lens and the shaking correction portion to be closer to the shaking correction portion, and the optical sensor is preferably held between the third support surface of the support portion and the lens cover. According to this structure, the optical sensor can be supported not only by the first and second support surfaces but also by the third support surface, whereby the optical sensor can be more stably fixed to the support portion. Further, the lens cover is so employed as the member for holding the optical sensor that no dedicated member may be provided for fixing the optical sensor, whereby the number of components is not increased.

In the aforementioned image sensor comprising the lens cover, the lens cover preferably integrally includes a protrusion for holding the optical sensor between the lens cover and the third support surface of the support portion. According to this structure, the optical sensor can be easily held between the lens cover and the third support surface of the support portion due to the protrusion of the lens cover.

In the aforementioned image sensor comprising the imaging element and the shaking correction portion, the shaking correction portion preferably includes a movable portion for moving the imaging element, the movable portion preferably has a sensor piece, the optical sensor is preferably so formed as to detect the position of the movable portion by receiving the sensor piece, and the support portion preferably further includes a sensor piece receiving portion on a side opposed to the first support surface. According to this structure, the moving sensor piece can be inserted into the optical sensor, which is supported by the support portion. Further, the mounting structure for the optical sensor according to the present invention is so applied to a moving mechanism for the shaking correction portion that no dedicated component may be separately provided for fixing the optical sensor for detecting the position of the movable portion, whereby increase in the number of components of the shaking correction portion can be suppressed.

In the aforementioned image sensor comprising the shaking correction portion, the shaking correction portion preferably includes the movable portion and a fixed portion movably supporting the movable portion, and the support portion is preferably integrally provided on the fixed portion or the movable portion. According to this structure, the support portion is integrally formed on the fixed portion or the movable portion of the shaking correction portion, whereby no dedicated component may be separately provided for fixing the optical sensor for detecting the position of the movable portion. Thus, increase in the number of components for fixing the optical sensor to the shaking correction portion can be suppressed.

In the aforementioned image sensor provided with the support portion including the second support surface, the support portion preferably further includes an L-shaped portion constituted of the first support surface and the second support surface. According to this structure, the number of components can be reduced as compared with a case of providing the first support surface and the second support surface orthogonal thereto independently of each other.

In this case, the support portion preferably further integrally includes a third support surface orthogonal to the first support surface and the second support surface, and the L-shaped portion is preferably so integrally provided as to protrude from the third support surface frontward. According to this structure, the number of components can be reduced as compared with a case of providing the L-shaped portion and the third support surface independently of each other.

In the aforementioned image sensor provided with the shaking correction portion including the movable portion having the sensor piece, the support portion preferably further includes a first projection so provided as to protrude from the third support surface frontward, and the optical sensor is preferably held between the second support surface and the first projection to be position-controlled in a direction orthogonal to the direction of movement of the sensor piece. According to this structure, the optical sensor can be inhibited from moving in the direction orthogonal to the direction of movement of the sensor piece.

In this case, the first projection of the support portion is so formed that the surface closer to the flexible wiring board is rounded. According to this structure, the flexible wiring board can be prevented from damage even if the first projection and the flexible wiring board come into contact with each other when the optical sensor is mounted on the support portion.

In the aforementioned image sensor provided with the support portion including the first projection, the optical sensor preferably includes a plurality of terminal portions so provided as to protrude from the flexible wiring board, and the first projection of the support portion is preferably arranged between the plurality of terminal portions. According to this structure, the first projection of the support portion and the terminal portions of the optical sensor can be easily inhibited from interfering with each other.

In the aforementioned image sensor provided with the shaking correction portion including the movable portion having the sensor piece, the support portion preferably further includes a second projection so provided as to protrude from the third support surface frontward, and the optical sensor is preferably held between the first support surface and the second projection to be position-controlled in a direction along the direction of movement of the sensor piece. According to this structure, the optical sensor can be inhibited from moving in the direction along the direction of movement of the sensor piece.

In the aforementioned image sensor provided with the shaking correction portion including the fixed portion, the support portion preferably includes a first support portion integrally provided on the fixed portion and a second support portion integrally provided on the movable portion, the optical sensor preferably includes a first optical sensor and a second optical sensor supported by the first support portion and the second support portion respectively, and the first optical sensor and the second optical sensor are preferably so formed as to detect the positions of the movable portion in directions X and Y orthogonal to each other. According to this structure, the number of components can be reduced as compared with a case of providing the first support portion and the fixed portion independently of each other and a case of providing the second support portion independently of the movable portion. Further, the first and second optical sensors detecting the positions of the movable portion in the directions X and Y orthogonal to each other can be easily supported by the first and second support portions respectively.

In this case, the first optical sensor supported by the first support portion is preferably held between a third support surface of the first support portion and a protrusion integrally provided on the lens cover, and the second optical sensor supported by the second support portion is preferably held between a third support surface of the second support portion and the lens cover. According to this structure, both of the first and second optical sensors supported by the first and second support portions respectively can be held between the single lens cover and the third support surfaces of the first and second support portions.

In the aforementioned image sensor provided with the support portion including the first and second support portions, the fixed portion and the movable portion of the shaking correction portion may have rectangular frame shapes, the first support portion may be arranged in the vicinity of a corner of the fixed portion, and the second support portion may be arranged in the vicinity of a corner of the movable portion.

In the aforementioned image sensor provided with the shaking correction portion including the movable portion having the sensor piece, the support portion preferably further includes a second projection so provided as to protrude from the third support surface frontward, the optical sensor preferably includes a detective recess portion detecting the sensor piece by receiving the sensor piece from the sensor piece receiving portion, and the second projection is preferably so arranged as to hold the optical sensor between the second projection and the first support surface on a position so avoiding the detective recess portion of the optical sensor as not to interfere with the moving sensor piece. According to this structure, the sensor piece inserted into the detective recess portion of the optical sensor can be reliably prevented from interfering with the second projection controlling the position of the sensor piece of the optical sensor in the direction of movement.

In the aforementioned image sensor provided with the support portion including the second support surface, the flexible wiring board preferably has a sensor mounting portion mounted with the optical sensor and a bent portion located in the vicinity of the sensor mounting portion, and is preferably so formed as to generate urging force toward the directions of the first support surface and the second support surface by torque directed toward directions X and Y orthogonal to each other on the basis of the bent portion. According to this structure, the flexible wiring board can easily generate the urging force toward the directions of the first and second support surfaces.

An image sensor according to a second aspect of the present invention comprises an imaging element imaging a subject, an X-Y stage moving the imaging element in directions X and Y orthogonal to each other, a Y stage supporting the X-Y stage to be movable in the direction X, a fixed stage supporting the Y stage to be movable in the direction Y, a first optical sensor for detecting a reference position of the Y stage in the direction Y, a second optical sensor for detecting a reference position of the X-Y stage in the direction X, a first support portion having an L-shaped first support wall surface for supporting the first optical sensor, a second support portion having an L-shaped second support wall surface for supporting the second optical sensor, a first flexible wiring board connected with the first optical sensor, bent around the portion connected with the first optical sensor and so formed as to generate urging force oppositely to the bent direction and a second flexible wiring board connected with the second optical sensor, bent around the portion connected with the second optical sensor and so formed as to generate urging force oppositely to the bent direction, while the first optical sensor is urged toward at least the L-shaped first support wall surface of the first support portion to be fixed thereto due to the urging force of the first flexible wiring board arranged in the bent manner, and the second optical sensor is urged toward at least the L-shaped second support wall surface of the second support portion to be fixed thereto due to the urging force of the second flexible wiring board arranged in the bent manner.

As hereinabove described, the image sensor according to the second aspect is provided with the X-Y stage moving the imaging element in the directions X and Y orthogonal to each other, the Y stage supporting the X-Y stage to be movable in the direction X, the fixed stage supporting the Y stage to be movable in the direction Y, the first optical sensor for detecting the reference position of the Y stage in the direction Y and the second optical sensor for detecting the reference position of the X-Y stage in the direction X, whereby the first and second optical sensors can easily detect the reference positions of the X-Y stage moving in the directions X and Y orthogonal to each other.

As hereinabove described, further, the image sensor is provided with the first support portion having the L-shaped first support wall surface supporting the first optical sensor, the second support portion having the L-shaped second support wall surface supporting the second optical sensor and the first and second flexible wiring boards connected with the first and second optical sensors, bent around the portions connected with the first and second optical sensors respectively and so formed as to generate the urging force oppositely to the bent directions while the first optical sensor is urged toward at least the L-shaped first support wall surface of the first support portion to be fixed thereto due to the urging force of the first flexible wiring board arranged in the bent manner and the second optical sensor is urged toward at least the L-shaped second support wall surface of the second support portion due to the urging force of the second flexible wiring board arranged in the bent manner, whereby the first optical sensor is urged toward the L-shaped first support wall surface of the first support portion to be fixed thereto due to the urging force generated by bending the first flexible wiring board and the second optical sensor is urged toward the L-shaped second support wall surface of the second support portion to be fixed thereto due to the urging force generated by bending the second flexible wiring board. Thus, no components for merely fixing the first and second optical sensors to the first and second support portions respectively may be provided, whereby increase in the number of components for fixing the first and second optical sensors to the first and second support portions respectively can be suppressed.

Further, the first and second optical sensors are fixed to the first and second support portions respectively due to the urging force generated by bending the first and second flexible wiring boards, whereby the first and second optical sensors can be fixed to the first and second support portions respectively by simply bending the first and second flexible wiring boards connected with the first and second optical sensors respectively and so arranging the first and second flexible wiring boards that the first and second optical sensors come into contact with the first and second support wall surfaces of the first and second support portions respectively. Thus, complication in the operation for fixing the first and second optical sensors to the first and second support portions respectively can be suppressed as compared with a case of fixing the first and second optical sensors to the first and second support portions respectively with an adhesive.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view for illustrating the structure of a shaking correction portion of the video camera according to the embodiment of the present invention shown in FIG. 1;

FIG. 5 is a plan view for illustrating the structure of the shaking correction portion of the video camera according to the embodiment of the present invention shown in FIG. 1;

DESCRIPTION OF THE PREFERRED EMBODIMENTS

An embodiment of the present invention is now described with reference to the accompanying drawings.

The structure of a video camera 1 according to the embodiment of the present invention is described with reference to FIGS. 1 to 15. This embodiment of the present invention is applied to the video camera 1, which is an exemplary image sensor.

Figure 1:
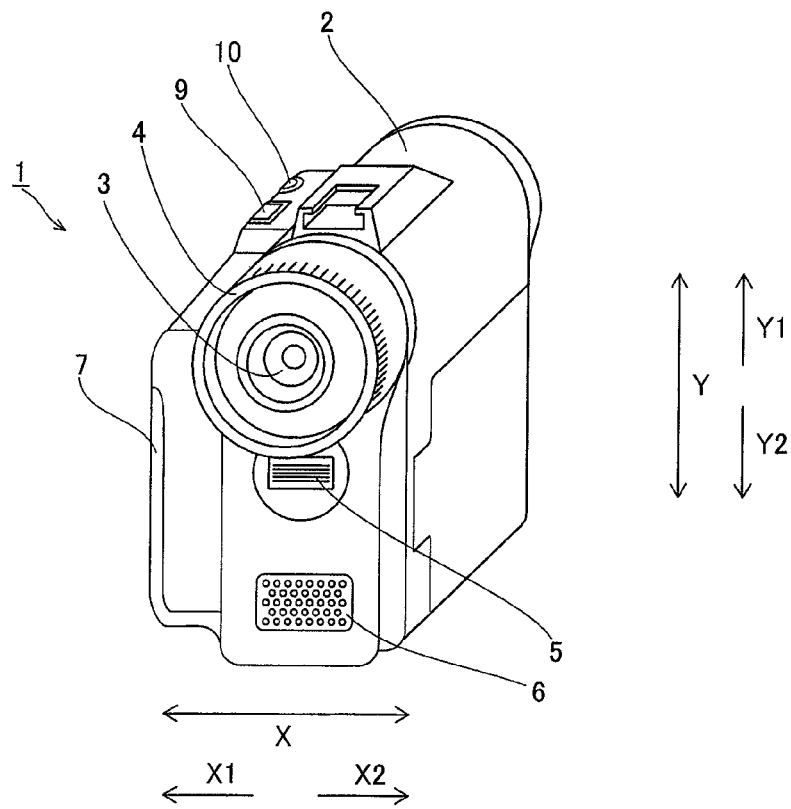
FIG. 1 is a perspective view showing the overall structure of a video camera according to an embodiment of the present invention.
Figure 2:
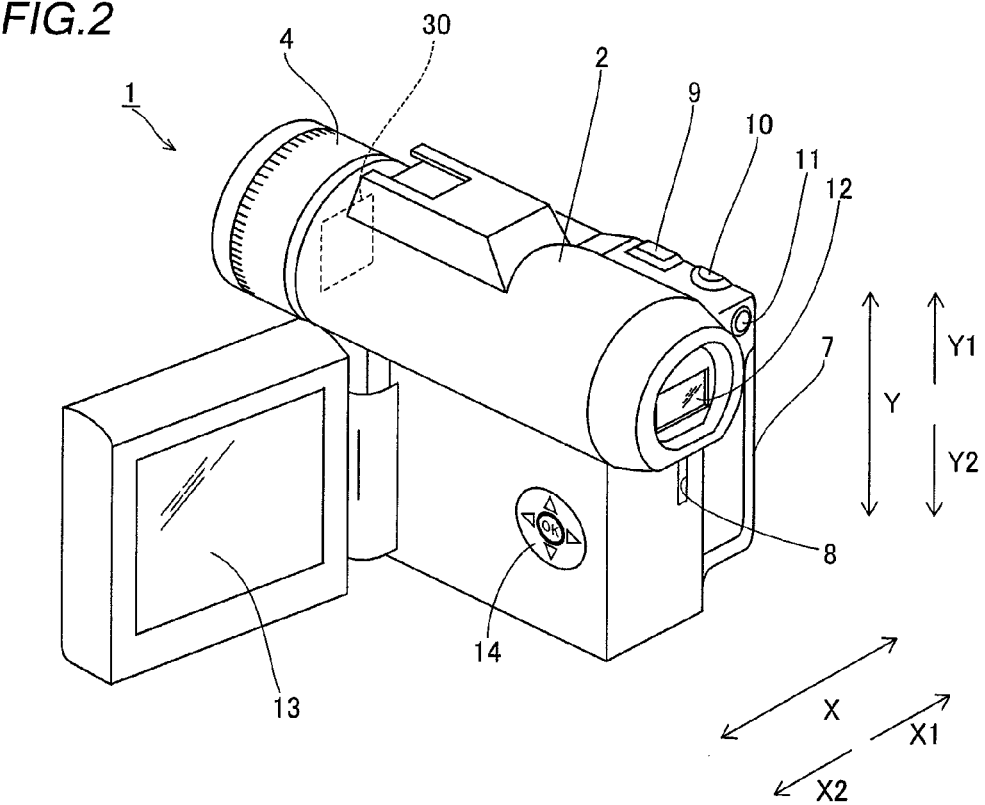
FIG. 2 is another perspective view showing the overall structure of the video camera according to the embodiment of the present invention.

In the video camera 1 according to the embodiment of the present invention, a camera body 2 is provided with a lens-barrel 4 storing a lens portion 3 (see FIG. 1) consisting of a plurality of optical lenses, a video cassette portion 7 on which a stroboscope 5 (see FIG. 1), a built-in microphone 6 (see FIG. 1) and a video tape (not shown) are detachably mounted and a memory card receiving portion 8 (see FIG. 2), as shown in FIGS. 1 and 2. The video camera 1 further comprises a recording/reproducing button 9 used when recording images, a shutter button 10 used for imaging still pictures, a power supply button 11 (see FIG. 2), a finder 12 (see FIG. 2) and a liquid crystal monitor 13 (see FIG. 2) capable of displaying the recorded images on the screen thereof. As shown in FIG. 2, a shaking correction portion 30 for moving a CCD 31 (see FIG. 3) described later is arranged in the camera body 2 at the back of the lens portion 3.

As shown in FIGS. 1 and 2, the lens-barrel 4 storing the lens portion 3 (see FIG. 1) is so formed as to horizontally protrude outward from the front surface of the camera body 2. The stroboscope 5 has a function of emitting light as auxiliary light. The built-in microphone 6 has a function of collecting sounds around a subject in imaging (recording). The video cassette portion 7 and the memory card receiving portion 8 are capable of storing dynamic pictures and still pictures in a video tape (not shown) and a memory card (not shown) respectively. The recording/reproducing button 9 is so pressed by the user as to start an operation of storing images picked up by the CCD 31 (see FIG. 3) described later in the video tape (not shown) and to stop the operation of storing the images in the video tape (not shown) upon completion of the recording.

The finder 12 and the liquid crystal monitor 13 are so formed that the user can decide the imaging range while observing the subject through either one or both of the finder 12 and the liquid crystal monitor 13. The liquid crystal monitor 13 is capable of displaying a set screen for setting images, sounds etc. of the video camera 1. An operating button 14 is so formed as to enable the user to select items from the set screen displayed on the liquid crystal monitor 13.

Figure 3:
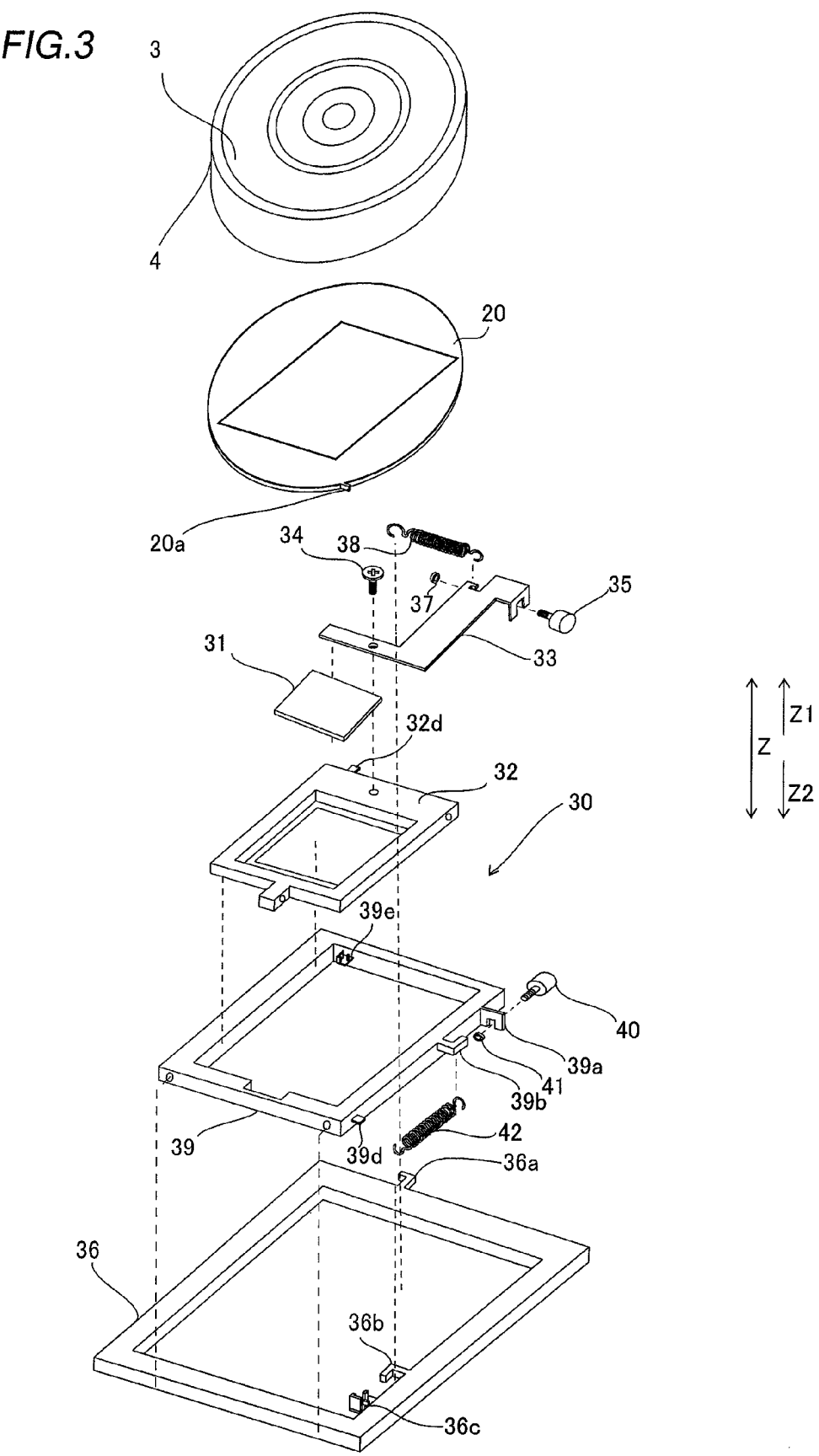
FIG. 3 is an exploded perspective view showing the structure of the video camera according to the embodiment of the present invention shown in FIG. 1.

According to this embodiment, the lens-barrel 4 storing the lens portion 3 is arranged on the shaking correction portion 30 along arrow Z1, as shown in FIG. 3. The lens cover 20 for stabilizing operations of the lens portion 3 and the lens-barrel 4 is arranged between the shaking correction portion 30 and the lens-barrel 4. This lens cover 20 has a protrusion 20a for fixing a photointerrupter 46 described later, as shown in FIGS. 4 and 5.

Figure 6:
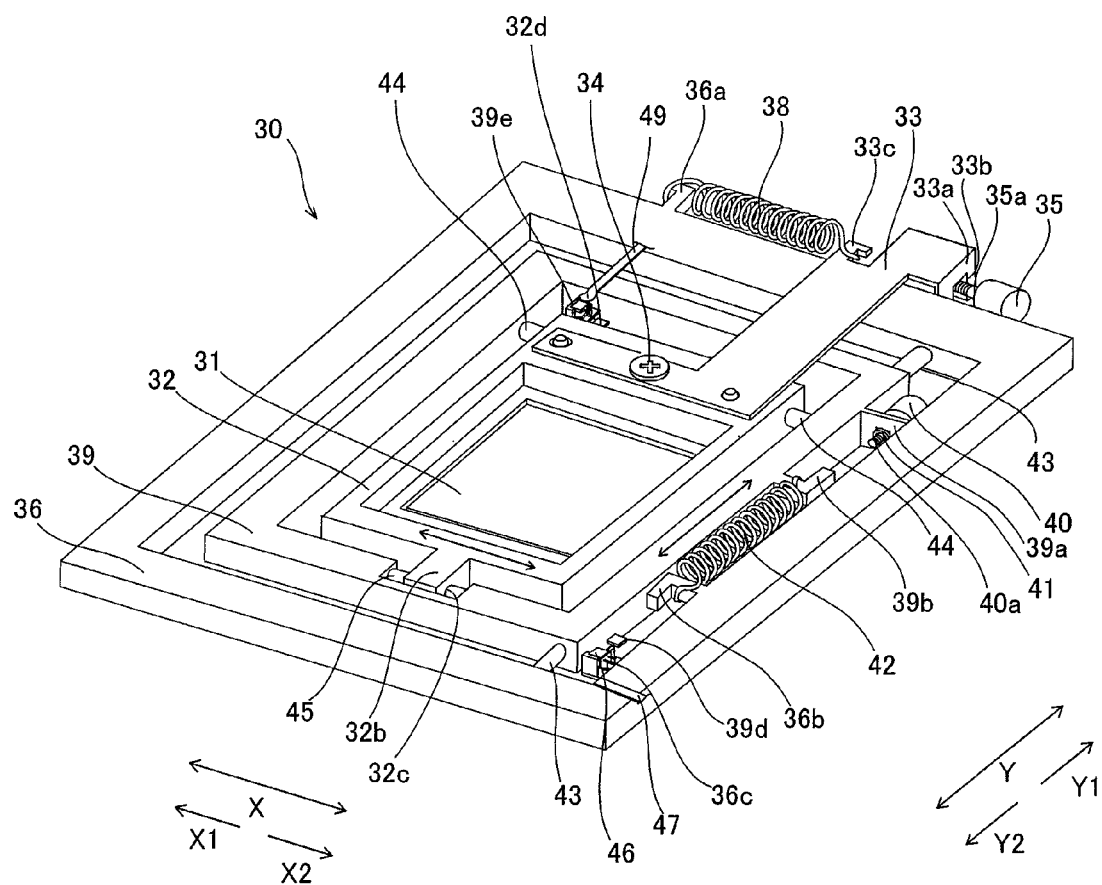
FIG. 6 is another perspective view for illustrating the structure of the shaking correction portion of the video camera according to the embodiment of the present invention shown in FIG. 1.
Figure 7:
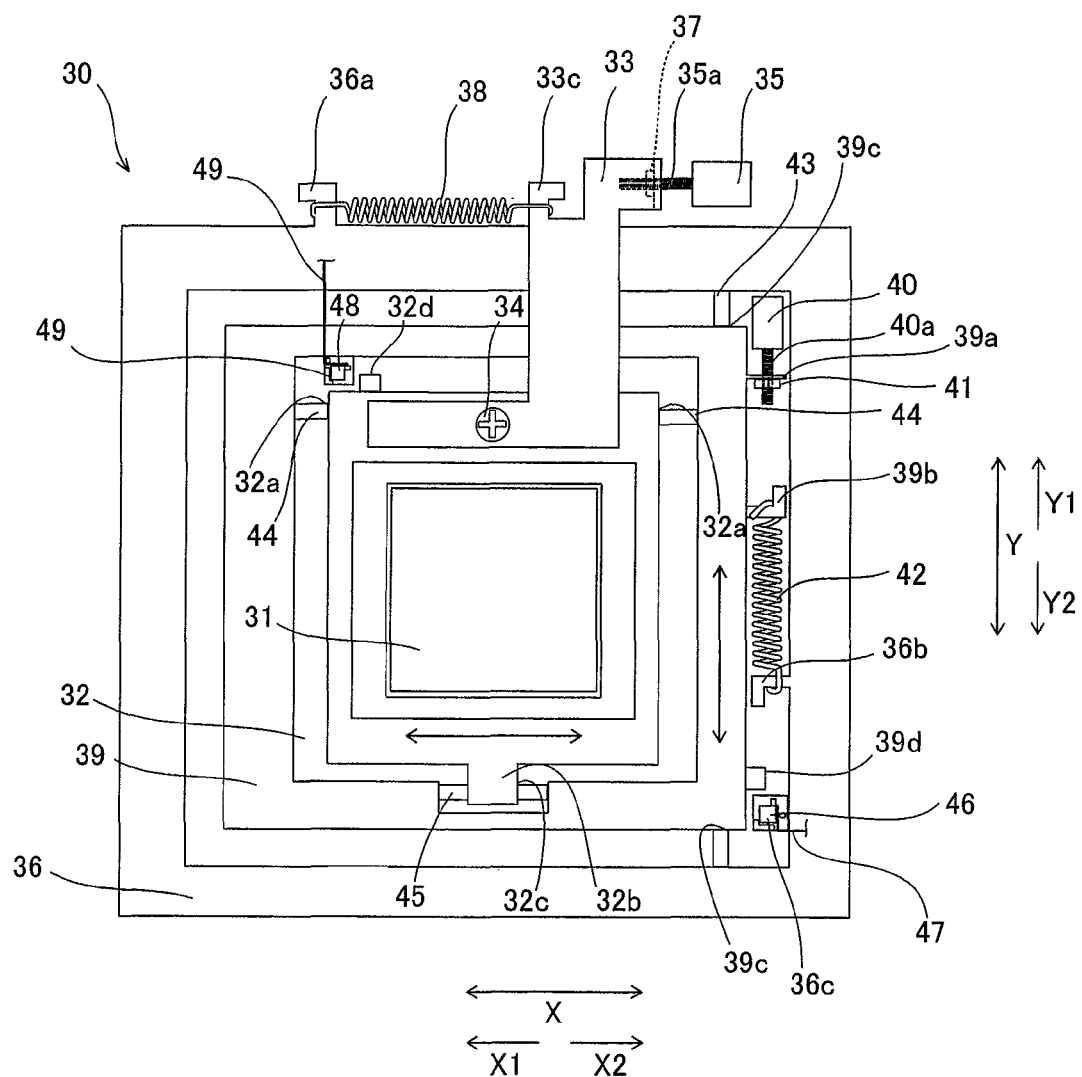
FIG. 7 is another plan view for illustrating the structure of the shaking correction portion of the video camera according to the embodiment of the present invention shown in FIG. 1.

As shown in FIGS. 6 and 7, the shaking correction portion 30 includes an X-Y stage 32, mounted with the CCD (charge-coupled device) 31 for picking up the dynamic and still pictures, for moving the CCD 31. The CCD 31 is an example of the "imaging element" in the present invention, and the X-Y stage 32 is an example of the "movable portion" in the present invention. An L-shaped arm member 33 for transmitting driving force of an X-axis stepping motor 35 described later to the X-Y stage 32 is mounted on the upper surface of an end of the X-Y stage 32 along arrow Y1. This arm member 33 is mounted on the X-Y stage 32 with a screw member 34.

A side surface portion 33a perpendicularly extending downward is provided on an end of the arm member 33 along arrow X2, on the outer side a fixed stage 36, described later, along arrow Y1. The X-axis stepping motor 35 serving as the driving source for moving the X-Y stage 32 in a direction X through the arm member 33 is provided on a side of the side surface portion 33a along arrow X2. This X-axis stepping motor 35 is fixed to the fixed stage 36 fixed to the camera body 2 (see FIGS. 1 and 2). The fixed stage 36 is an example of the "fixed portion" in the present invention. The X-axis stepping motor 35 includes a motor screw 35a in the form of a screw shaft rotationally driven by the X-axis stepping motor 35. This motor screw 35a is inserted into a notch 33b provided on the side surface portion 33a of the arm member 33, to mesh with a nut member 37 arranged on the side along arrow X1 with respect to the side surface portion 33a of the arm member 33. The X-axis stepping motor 35 converts the rotational driving to linear driving through this nut member 37, so that the X-Y stage 32 is linearly movable in the direction X.

A helical tension spring 38 is arranged on the side of the fixed stage 36 along arrow Y1. This helical tension spring 38 has an end mounted on a hook portion 36a formed on the side of the fixed stage 36 along arrow Y1 and another end mounted on another hook portion 33c formed on the side of the side surface portion 33a of the arm member 33 along arrow X1. The helical tension spring 38 is provided in order to urge the X-Y stage 32 along arrow X1, and arranged substantially parallelly to the direction X. Thus, the helical tension spring 38 so regularly urges the X-Y stage 32 along arrow X1 that formation of a clearance between the motor screw 35a and the nut member 37 can be suppressed upon movement of the X-Y stage 32 along arrow X1.

The shaking correction portion 30 further includes a Y stage 39 for moving the X-Y stage 32 in a direction Y, as shown in FIGS. 6 and 7. In the vicinity of an end of the Y stage 39 along arrow X2, a Y-axis stepping motor 40 serving as a driving source for moving the Y stage 39 in the direction Y is arranged on a side along arrow Y1. The Y stage 39 is an example of the "movable portion" in the present invention. The Y stage 39 includes a mounting portion 39a in the vicinity of a side of the Y-axis stepping motor 40 along arrow Y2. The Y-axis stepping motor 40 includes a motor screw 40a in the form of a screw shaft, similarly to the X-axis stepping motor 35. This motor screw 40a meshes with another nut member 41 arranged on the side opposite to the Y-axis stepping motor 40 with respect to the mounting portion 39a. The Y-axis stepping motor 40 moves the Y stage 39 in the direction Y through the nut member 41. The Y-axis stepping motor 40 is fixed to the fixed stage 36.

Another helical tension spring 42 is arranged on the side of the Y-axis stepping motor 40 along arrow Y2. The Y stage 39 has a hook portion 39b connected with an end of the helical tension spring 42 along arrow Y1 on the side of the mounting portion 39a along arrow Y2. The fixed stage 36 has a hook portion 36b on the side of the hook portion 39b along arrow Y2. Another end of the helical tension spring 42 along arrow Y2 is connected to the hook portion 36b. The helical coil spring 42 is provided in order to urge the Y stage 39 along arrow Y2, and arranged to be substantially parallel to the direction Y. Thus, the helical tension spring 42 so regularly urges the Y stage 39 along arrow Y2 that formation of a clearance between the motor screw 40a and the nut member 41 can be suppressed upon movement of the Y stage 39 along arrow Y2.

As shown in FIGS. 6 and 7, a Y-axis sliding shaft 43 arranged parallelly to the direction Y and inserted into a shaft hole 39c provided on the Y stage 39 is mounted on the side of the fixed stage 36 along arrow X2. The Y-axis sliding shaft 43 is so designed that the diameter thereof is slightly smaller than that of the shaft hole 39c, so that the Y stage 39 is slidable with respect to the Y-axis sliding shaft 43. Thus, the Y stage 39 is stably movable in the direction Y.

X-axis sliding shafts 44 and 45 arranged parallelly to the direction X are mounted on the sides of the Y stage 39 along arrows Y1 and Y2 respectively. The X-axis sliding shaft 44 is inserted into a shaft hole 32a provided at the center of the X-Y stage 32 in the direction Y. The X-axis sliding shaft 45 is inserted into another shaft hole 32c provided on a projecting portion 32b on an end of the X-Y stage 32 along arrow Y2. The X-axis sliding shafts 44 and 45 are so designed that the diameters thereof are slightly smaller than those of the shaft holes 32a and 32b respectively, so that the X-Y stage 32 is slidable with respect to the X-axis sliding shafts 44 and 45.

Thus, the X-Y stage 32 is stably movable in the direction X, and also movable in the direction Y following the movement of the Y stage 39 in the direction Y.

Figure 8:
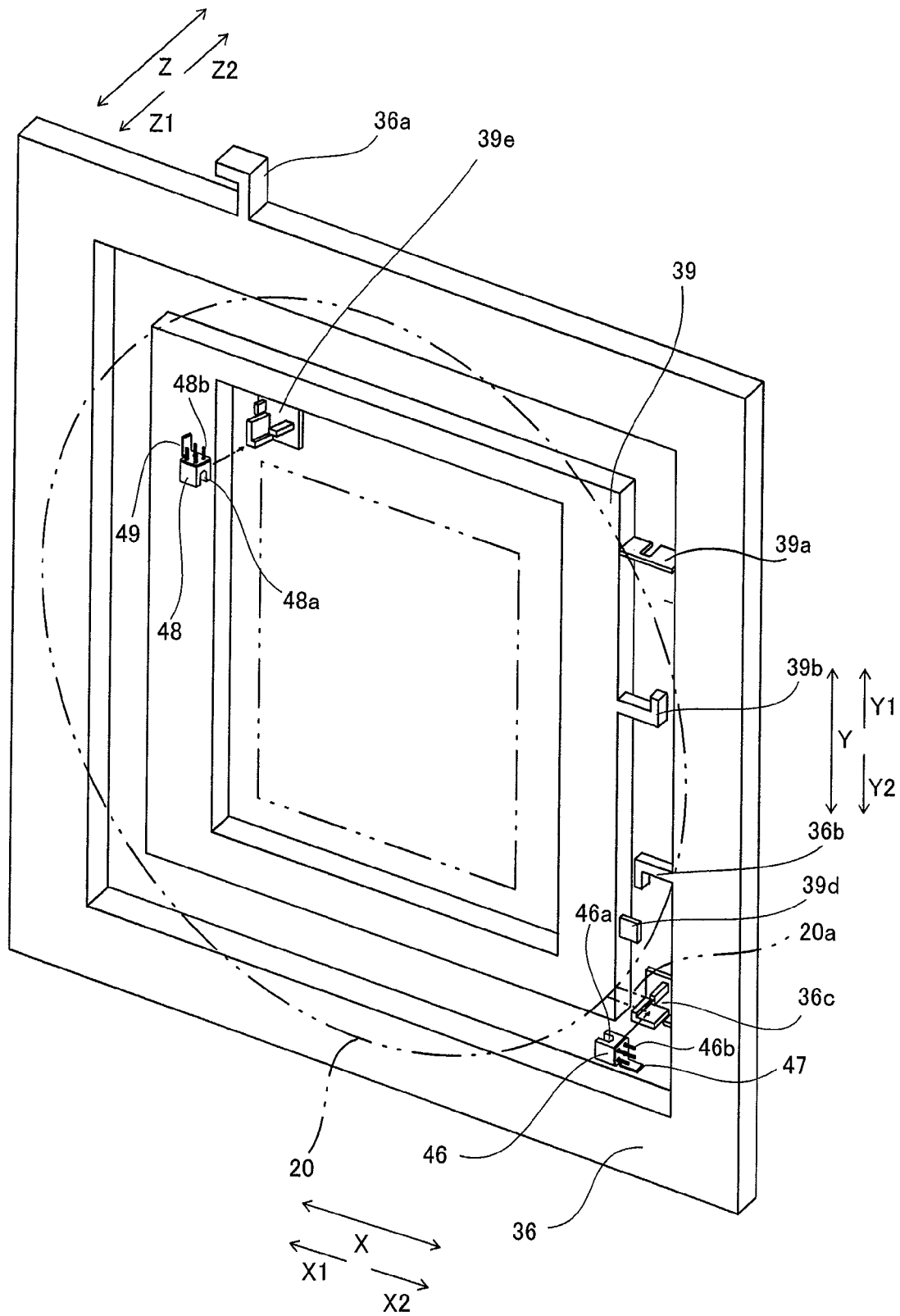
FIG. 8 illustrates the structures of a support portion and a photointerrupter of the video camera according to the embodiment of the present invention shown in FIG. 1.

According to this embodiment, a sensor piece 39d is integrally formed along arrow Z2 in the vicinity of a corner of the Y-stage 39 along arrows X2 and Y2, as shown in FIGS. 7 and 8. Further, a support portion 36c for fixing a photointerrupter 46, which is a transmission optical sensor for detecting the sensor piece 39d of the Y stage 39 moving in the direction Y, is integrally provided in the vicinity of a corner of the fixed stage 36 along arrows X2 and Y2. The photointerrupter 46 is an example of the "optical sensor" or the "first optical sensor" in the present invention, and the support portion 36c is an example of the "first support portion" in the present invention. The photointerrupter 46 is provided for detecting movement of the Y stage 39 to a reference position when the power supply button 11 (see FIG. 2) is pressed. When the Y stage 39 is located on the reference position, the sensor piece 39d enters a detective recess portion 46a of the photointerrupter 46, to be detected by the photointerrupter 46.

Figure 9:
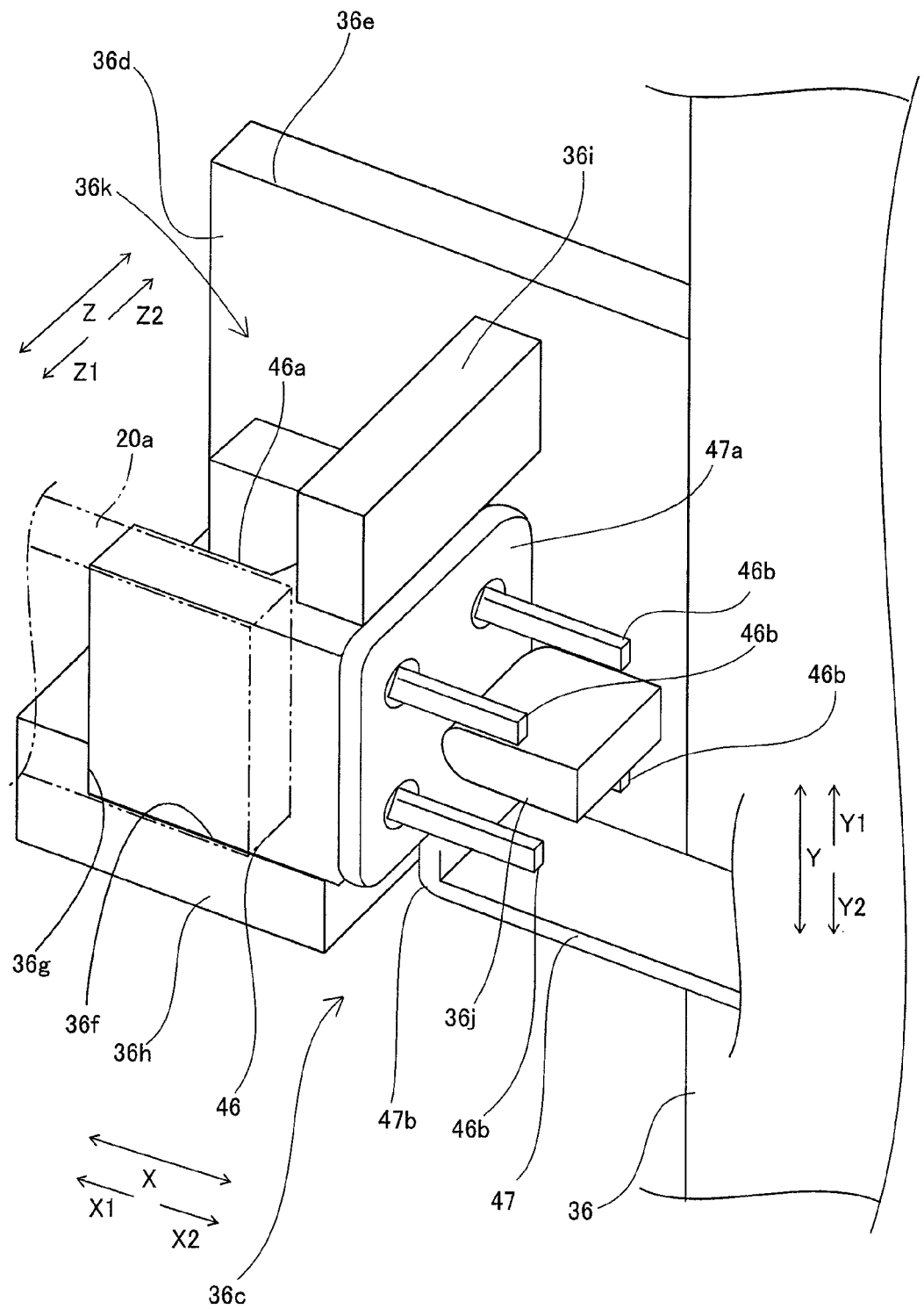
FIG. 9 is an enlarged perspective view showing the structures of the support portion and the photointerrupter shown in FIG. 8.

According to this embodiment, four terminals 46b of the photointerrupter 46 are electrically connected to a sensor connecting portion 47a in the vicinity of an end of a bendable flexible wiring board 47 (hereinafter referred to as "FPC (flexible printed circuit) 47") by soldering or the like, as shown in FIG. 9. This FPC 47 is provided for supplying power to the photointerrupter 46 and transmitting an electric signal output from the photointerrupter 46 to a circuit board (not shown). The FPC 47 is arranged in a state bent on a bent portion 47b positioned in the vicinity of the sensor connecting portion 47a. The sensor connecting portion 47a is so formed as to generate urging force along arrow P on the basis of the bent portion 47b, as shown in FIG. 10.

Figure 11:
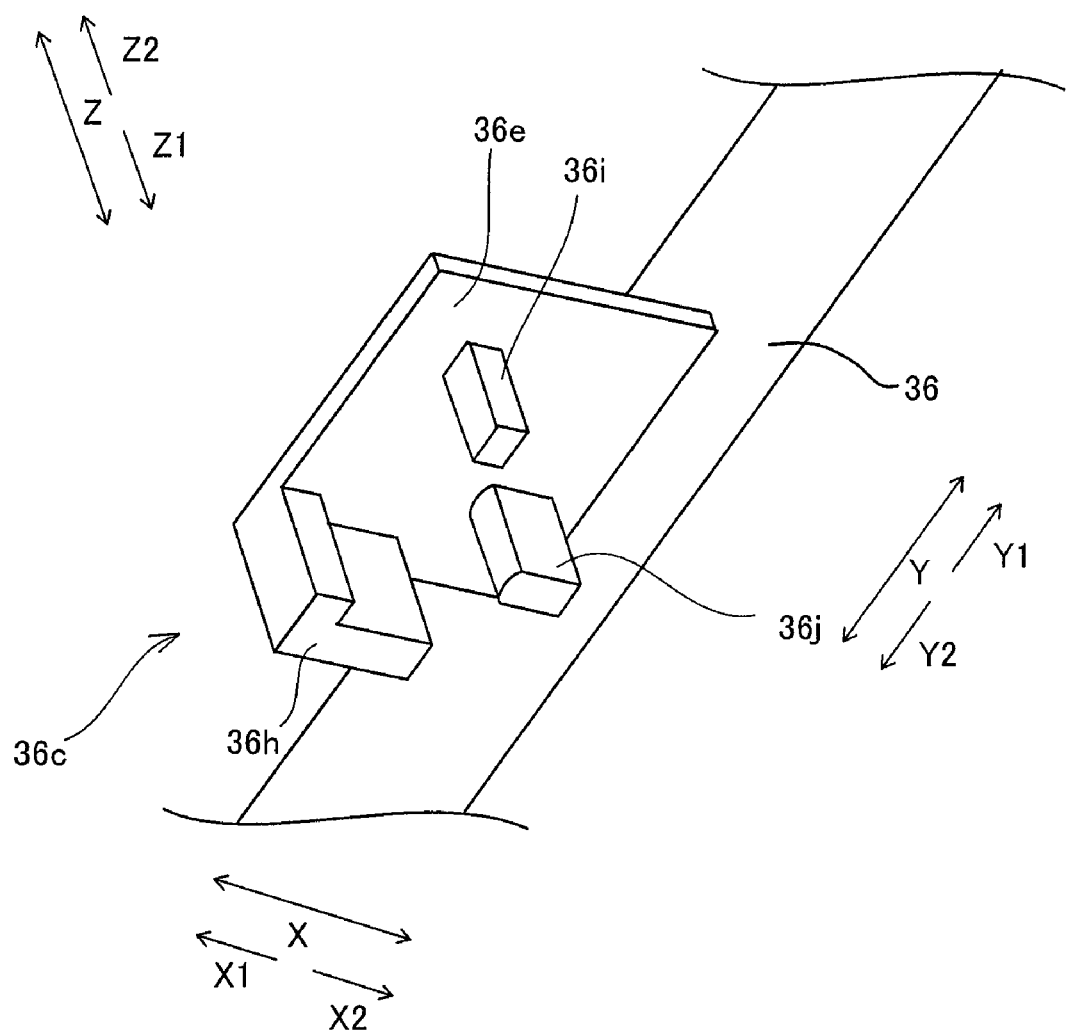
FIG. 11 is an enlarged perspective view showing the structure of the support portion shown in FIG. 8.
Figure 12:
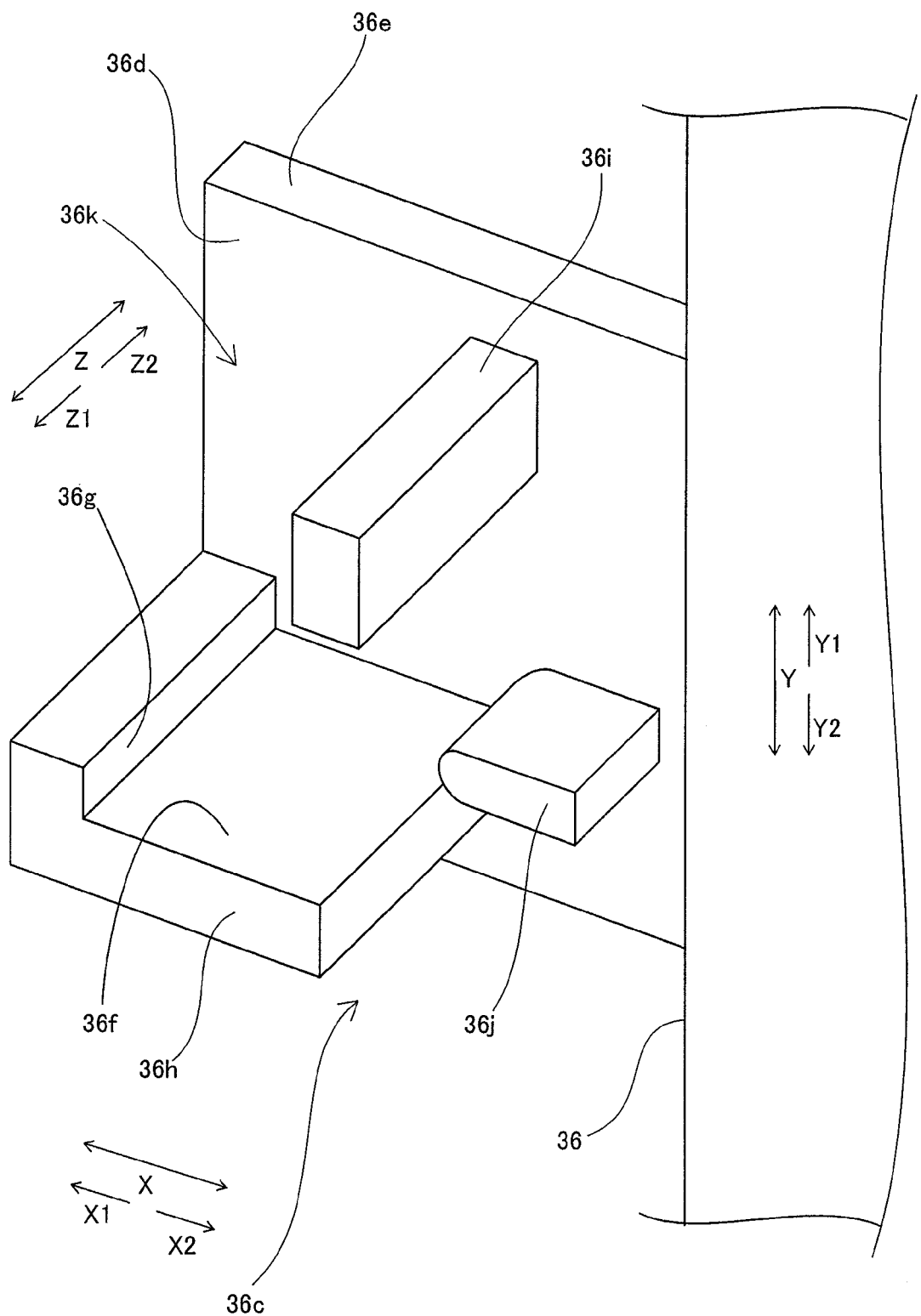
FIG. 12 is another enlarged perspective view showing the structure of the support portion shown in FIG. 8.

As shown in FIG. 11, the support portion 36c is so formed as to protrude along arrow X1 from a portion around the center of the inner side surface of the fixed stage 36 in the thickness direction. Further, the support portion 36c includes a wall portion 36e having a support wall surface 36d supporting the photointerrupter 46 (see FIG. 9) along arrow Z1, as shown in FIG. 12. The support wall surface 36d is an example of the "third support surface" in the present invention. The support portion 36c further includes an L-shaped portion 36h having support wall surfaces 36f and 36g supporting the photointerrupter 46 along arrows Y1 and X2 respectively. This L-shaped portion 36h is so formed as to protrude from the wall portion 36e along arrow Z1. The support wall surface 36f is an example of the "first support surface" or the "first support wall surface" in the present invention, and the support wall surface 36g is an example of the "second support surface" in the present invention.

Figure 10:
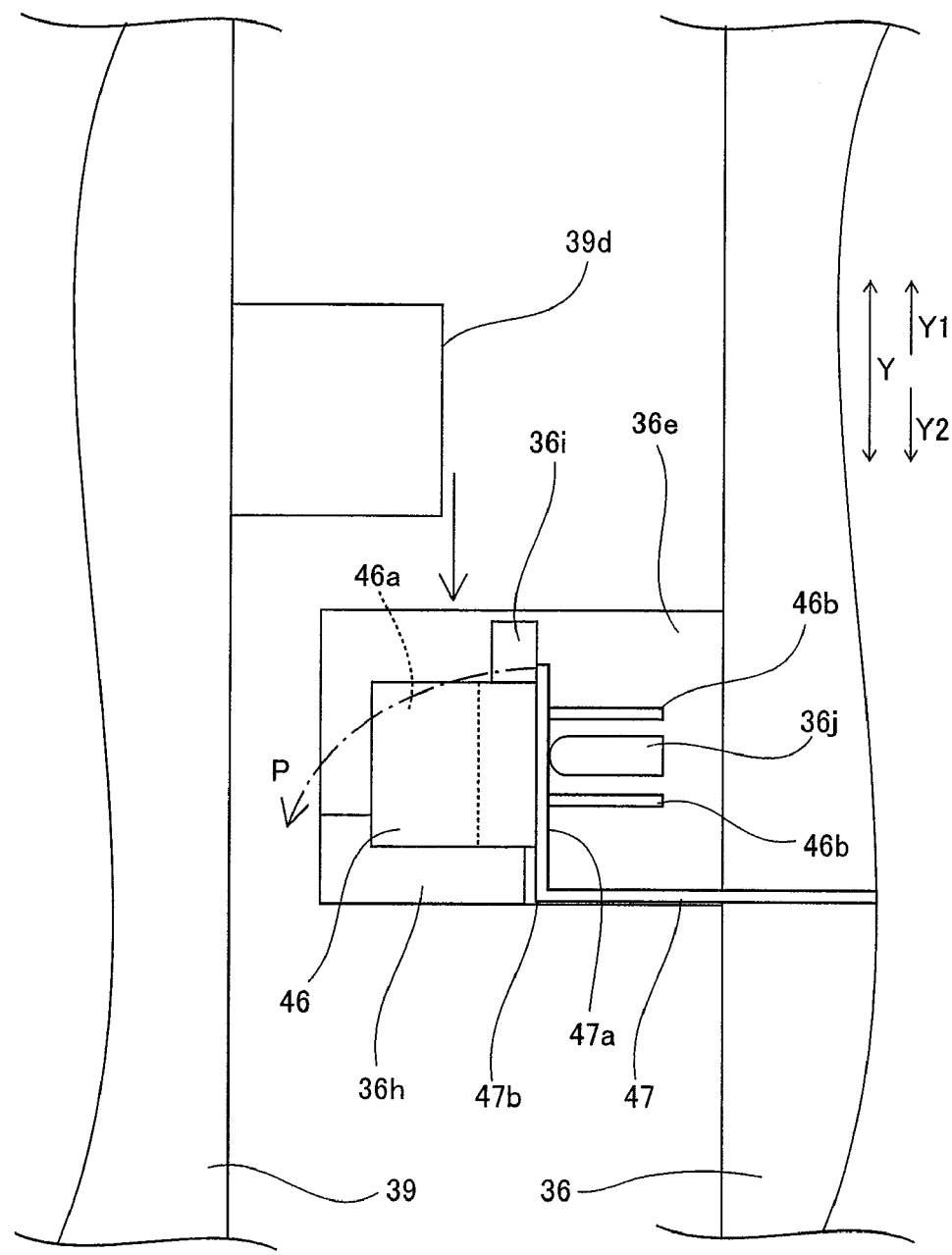
FIG. 10 is an enlarged plan view showing the structures of the support portion and the photointerrupter shown in FIG. 8.

According to this embodiment, the photointerrupter 46 urged along arrow P by the sensor connecting portion 47a of the FPC 47 bent on the bent portion 47b is supported by the support wall surfaces 36f and 36g of the L-shaped portion 36h, as shown in FIG. 10. More specifically, the elastic FPC 47 bent on the bent portion 47b generates repulsive force along arrow P on the sensor connecting portion 47a. Thus, the photointerrupter 46 is pressed by the sensor connecting portion 47a of the FPC 47 and the support wall surfaces 36f and 36g of the L-shaped portion 36h, to be supported by the support wall surfaces 36f and 36g.

As shown in FIGS. 9 and 12, the support portion 36c further includes a projection 36i so formed as to protrude from the wall portion 36e along arrow Z1, for regulating movement of the photointerrupter 46 along arrow Y1. The projection 36i is an example of the "second projection" in the present invention. This projection 36i is arranged on a position avoiding the detective recess portion 46a of the photointerrupter 46. The support portion 36c also includes another projection 36j so formed as to protrude from the wall portion 36e along arrow Z1, for regulating movement of the sensor connecting portion 47a of the FPC 47 and the photointerrupter 46 along arrow X2. The projection 36j is an example of the "first projection" in the present invention. This projection 36j is arranged between the four terminals 46b of the photointerrupter 46. The surface of the projection 36j closer to the FPC 47 is rounded. An open portion 36k for introducing the sensor piece 39d into the photointerrupter 46 (see FIG. 9) is provided on a side of the support portion 36c along arrow Y1. The open portion 36k is an example of the "sensor piece receiving portion" in the present invention.

According to this embodiment, the lens cover 20 includes a protrusion 20a so formed as to protrude outward from the outer peripheral surface, as shown in FIGS. 3 to 5 and 8. This protrusion 20a is provided for regulating movement of the photointerrupter 46 along arrow Z1, as shown in FIGS. 4, 8 and 9. Thus, the photointerrupter 46 is held between the protrusion 20a and the wall portion 36e of the support portion 36c, to be fixed thereto with respect to the direction Z.

According to this embodiment, another sensor piece 32d is integrally formed in the vicinity of a corner of the X-Y stage 32 along arrows X1 and Y1, as shown in FIGS. 6 and 7. Further, another photointerrupter 48, which is a transmission optical sensor for detecting the sensor piece 32d of the X-Y stage 32 moving in the direction X, is arranged and a support portion 39e for fixing the photointerrupter 48 is integrally provided in the vicinity of a corner of the Y-stage 39 along arrows X2 and Y2. The support portion 39e is an example of the "second support portion" in the present invention, and the photointerrupter 48 is an example of the "optical sensor" or the "second optical sensor" in the present invention. This photointerrupter 48 is provided for detecting movement of the X-Y stage 32 to a reference position when the power supply button 11 (see FIG. 2) is pressed. When the X-Y stage 32 is located on the reference position, the sensor piece 32d enters a detective recess portion 48a of the photointerrupter 48, to be detected by the photointerrupter 48.

Figure 13:
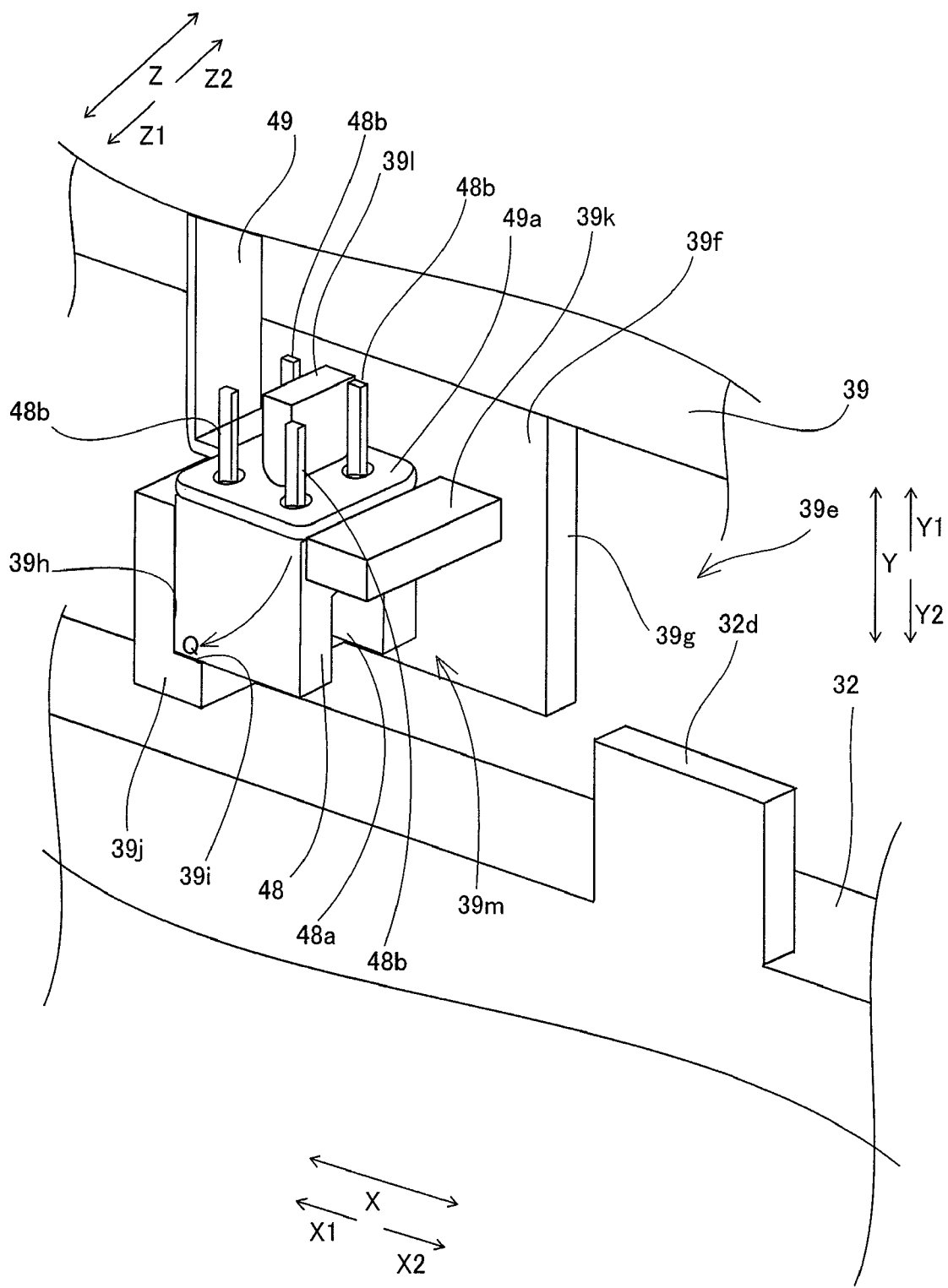
FIG. 13 is another enlarged perspective view showing the structures of the support portion and the photointerrupter shown in FIG. 8.

According to this embodiment, four terminals 48b of the photointerrupter 48 are electrically connected to a sensor connecting portion 49a in the vicinity of an end of a bendable flexible wiring board 49 (hereinafter referred to as "FPC 49") by soldering or the like, as shown in FIG. 13. This FPC 49 is provided for supplying power to the photointerrupter 48 and transmitting an electric signal output from the photointerrupter 48 to the circuit board (not shown). The FPC 49 is arranged in a state bent on a bent portion 49b positioned in the vicinity of the sensor connecting portion 49a. The sensor connecting portion 49a is so formed as to generate urging force toward an L-shaped portion 39j described later on the basis of the bent portion 49b.

According to this embodiment, the support portion 39e is so formed as to protrude from the thickness direction of the inner side surface of the fixed stage 37b along arrow Y2, as shown in FIG. 13. The support portion 39e includes a wall portion 39g having a support wall surface 39f supporting the photointerrupter 48 along arrow Z1. The support wall surface 39f is an example of the "third support surface" in the present invention. The support portion 39e further includes the L-shaped portion 39j having support wall surfaces 39h and 39i supporting the photointerrupter 48 along arrows X1 and Y2 respectively. This L-shaped portion 39j is so formed as to protrude from the wall portion 39g along arrow Z1. The support wall surface 39h is an example of the "first support surface" or the "second support wall surface" in the present invention, and the support wall surface 39i is an example of the "second support surface" in the present invention.

According to this embodiment, the photointerrupter 48 urged by the sensor connecting portion 49a of the FPC 49 bent on the bent portion 49c along arrow Q is supported by the support wall surfaces 39h and 39i of the L-shaped portion 39j, as shown in FIG. 13. Thus, the photointerrupter 48 is held between the sensor connecting portion 49a of the FPC 49 and the support wall surfaces 39h and 39i of the L-shaped portion 39j.

As shown in FIG. 13, the support portion 39e further includes a projection 39k so formed as to protrude from the wall portion 39g along arrow Z1 for regulating movement of the photointerrupter 48 along arrow X2. The projection 39k is an example of the "second projection" in the present invention. This projection 39k is arranged on a position avoiding the detective recess portion 48a of the photointerrupter 48. The support portion 39e also includes another projection 39l so formed as to protrude from the wall portion 39g along arrow Z1 for regulating movement of the sensor connecting portion 49a of the FPC 49 and the photointerrupter 48 along arrow Y1. The projection 39l is an example of the "first projection" in the present invention. This projection 39l is arranged between the four terminals 48b of the photointerrupter 48. The surface of the projection 39l closer to the FPC 49 is rounded. An open portion 39m for introducing the sensor piece 32d into the photointerrupter 48 is provided on a side of the support portion 39e along arrow X2. The open portion 39m is an example of the "sensor piece receiving portion" in the present invention.

According to this embodiment, the photointerrupter 46 is held between the lens cover 20 and the wall portion 39g of the support portion 39e, as shown in FIGS. 4, 5 and 8.

Figure 14:
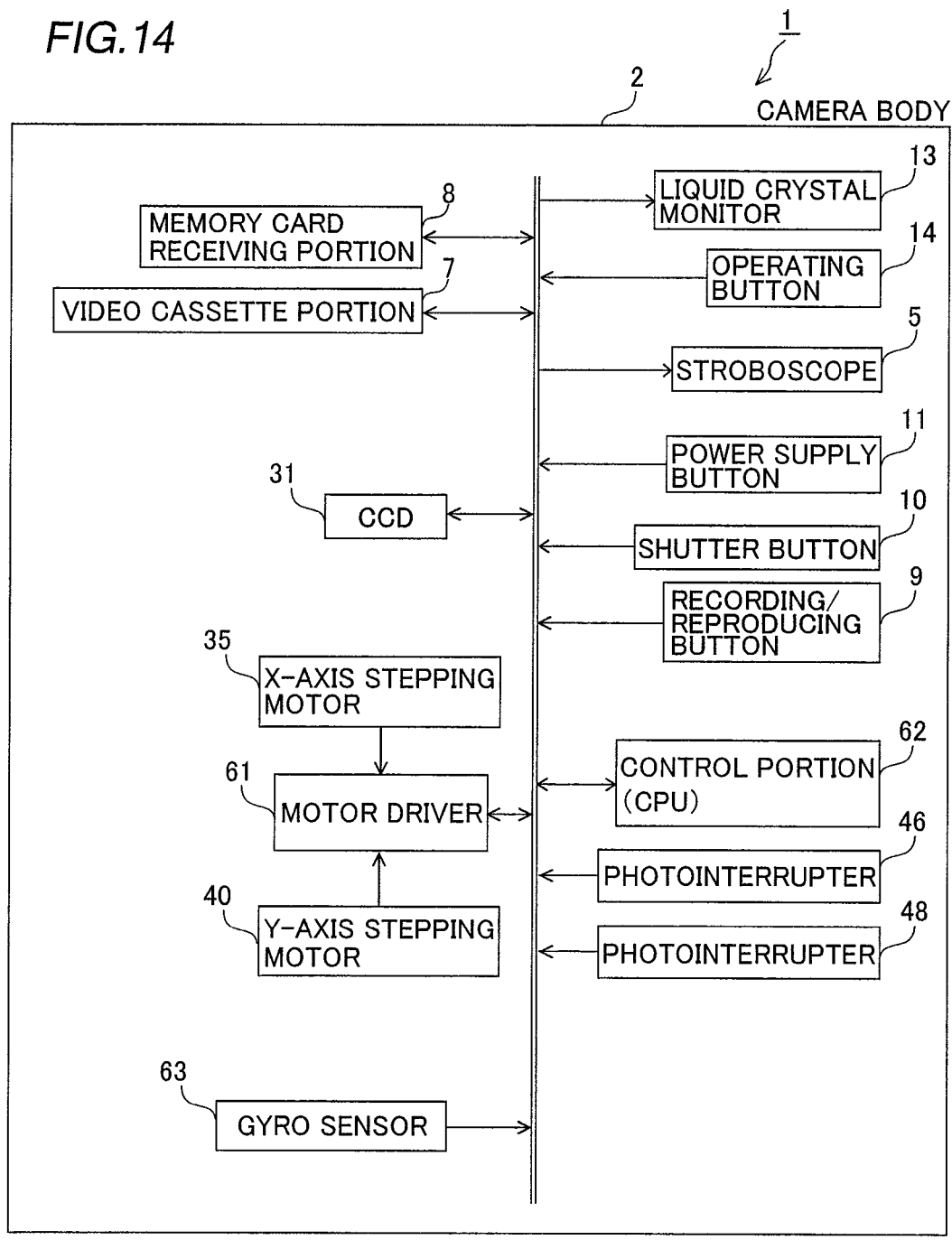
FIG. 14 is a block diagram showing the structure of the video camera according to the embodiment of the present invention shown in FIG. 1.
Figure 15:
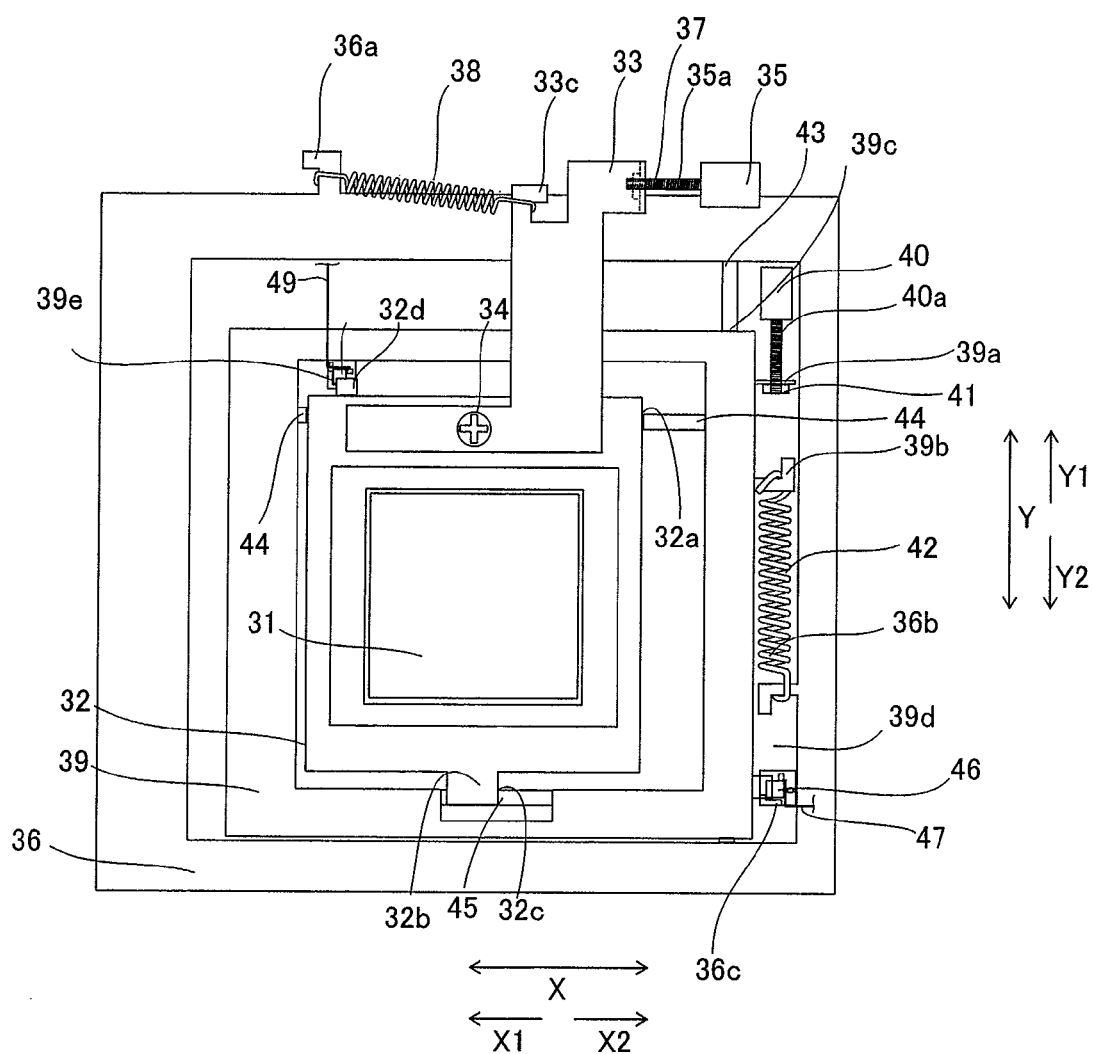
FIG. 15 is a plan view for illustrating reference positions of an X-Y stage and a Y stage of the video camera according to the embodiment of the present invention shown in FIG. 1.

According to this embodiment, a control portion 62 formed by a CPU controlling the X-axis stepping motor 35 and the Y-axis stepping motor 40 through a motor driver 61 is arranged in the camera body 2, as shown in FIG. 14. The control portion 62 is so formed as to drive the X-axis stepping motor 35 and the Y-axis stepping motor 40 through the motor driver 61 for moving the X-Y stage 32 and the Y-stage 39 to the reference positions respectively when the power supply button 11 is pressed. A gyro sensor 63 for sensing shaking of the camera body 2 is provided in the camera body 2. Information on the quantity of shaking of the camera body 2 detected by the gyro sensor 63 is transmitted to the control portion 62.

When the power supply button 11 is pressed, the control portion 62 so rotationally drives the X-axis stepping motor 35 and the Y-axis stepping motor 40 that the X-Y stage 32 and the Y stage 39 reach the reference positions respectively. When the Y stage 39 reaches the reference position shown in FIG. 15, the photointerrupter 46 detects the sensor piece 39d entering the detective recess portion 46a, and transmits information on this detection to the control portion 62. When the X-Y stage 32 reaches the reference position shown in FIG. 15, the photointerrupter 48 detects the sensor piece 32d entering the detective recess portion 48a, and transmits information on this detection to the control portion 62.

Further, the control portion 62 is so formed as to control the gyro sensor 63 to start detecting the quantity of shaking of the camera body 2 while driving the X-axis stepping motor 35 and the Y-axis stepping motor 40 through the motor driver 61 to move the X-Y stage 32 and the Y stage 39 in directions for reducing the quantity of shaking of the CCD 31 on the basis of the quantity of shaking detected by the gyro sensor 63 when the shutter button 10 is pressed.

According to this embodiment, as hereinabove described, the video camera 1 is provided with the FPC 47 bent around the sensor connecting portion 47a mounted with the photointerrupter 46 and so formed as to generate the urging force oppositely to the direction bent on the sensor connecting portion 47a and the support portion 36c at least having the support wall surface 36f supporting the photointerrupter 46 while the photointerrupter 46 is urged toward at least the support wall surface 36f of the support portion 36c to be fixed thereto due to the urging force of the sensor connecting portion 47a of the FPC 47 arranged in the bent manner, whereby the photointerrupter 46 is urged toward the support wall surface 36f of the support portion 36c to be fixed thereto due to the urging force resulting from the FPC 47 bent around the sensor connecting portion 47a. Thus, no additional component may be provided for merely fixing the photointerrupter 46 to the support portion 36c, whereby increase in the number of components for fixing the photointerrupter 46 to the support portion 36c can be suppressed. Further, the photointerrupter 46 is fixed to the support wall surface 36f of the support portion 36c due to the urging force resulting from the FPC 47 bent around the sensor connecting portion 47a, whereby the photointerrupter 46 can be fixed to the support portion 36c by simply bending the FPC 47 mounted with the photointerrupter 46 on the sensor connecting portion 47a around the sensor connecting portion 47a and arranging the FPC 47 so that the photointerrupter 46 comes into contact with the support wall surface 36f of the support portion 36c. Thus, complication in the operation for fixing the photointerrupter 46 to the support portion 36c can be suppressed as compared with a case of fixing the photointerrupter 46 to the support portion 36c with an adhesive.

According to this embodiment, as hereinabove described, the support portion 36c is further provided with the support wall surface 36g orthogonal to the support wall surface 36f so that the photointerrupter 46 is urged not only in the direction of the support wall surface 36f but also in the direction of the support wall surface 36g due to the urging force of the sensor connecting portion 47a of the FPC 47. Thus, the photointerrupter 46 is fixed not only by the support wall surface 36f but also by the support wall surface 36g orthogonal to the support wall surface 36f due to the urging force generated by the sensor connecting portion 47a of the FPC 47. Consequently, the photointerrupter 46 can be more stably fixed by the support portion 36c.

According to this embodiment, as hereinabove described, the support portion 36c is further provided with the support wall surface 36d orthogonal to the support wall surfaces 36f and 36g and the video camera 1 is further provided with the CCD 31 imaging the subject, the camera body 2 including the CCD 31, the shaking correction portion 30 for detecting and correcting shaking of the camera body 2, the lens portion 3 for incorporating light from the direction of the subject and the lens cover 20 arranged between the lens portion 3 and the shaking correction portion 30 to be closer to the shaking correction portion 30, so that the photointerrupter 46 is held between the support wall surface 36d of the support portion 36c and the lens cover 20. Thus, the photointerrupter 46 can be supported not only by the support wall surfaces 36f and 36g but also by the support wall surface 36d, to be further stably fixed by the support portion 36c. Further, the lens cover 20 is so employed as the member for holding the photointerrupter 46 between the same and the support wall surface 36d that no dedicated member may be provided for fixing the photointerrupter 46, whereby the number of components is not increased.

According to this embodiment, as hereinabove described, the lens cover 20 is so integrally provided with the protrusion 20a for holding the photointerrupter 46 between the same and the support wall surface 36d of the support portion 36c that the photointerrupter 46 can be easily held between the lens cover 20 and the support wall surface 36d of the support portion 36c through the protrusion 20a of the lens cover 20.

According to this embodiment, as hereinabove described, the shaking correction portion 30 is provided with the X-Y stage 32 for moving the CCD 31, the X-Y stage 32 is provided with the sensor piece 39d, the photointerrupter 46 is so formed as to detect the position of the Y stage 39 by receiving the sensor piece 39d, and the support portion 36c is further provided with the open portion 36k on the side opposed to the support wall surface 36f. According to this structure, the moving sensor piece 39d can be inserted into the photointerrupter 46 fixed by the support portion 36c. Further, the mounting structure of the photointerrupter 46 according to the present invention is so applied to the moving mechanism for the shaking correction portion 30 that no dedicated component may be separately provided for fixing the photointerrupter 46 for detecting the position of the Y stage 39, whereby increase in the number of components of the shaking correction portion 30 can be suppressed.

According to this embodiment, the shaking correction portion 30 is provided with the Y stage 39 and the fixed stage 36 movably supporting the Y stage 39, and the support portion 36c is integrally provided on the fixed stage 36. Thus, the support portion 36c is so integrally formed on the fixed stage 39 that no dedicated component may be separately provided for fixing the photointerrupter 46 for detecting the position of the Y stage 39. Further, the support portion 39e is so integrally provided on the Y stage 39 that no dedicated component may be separately provided for fixing the photointerrupter 48 for detecting the position of the X-Y stage 32. Consequently, the number of components for fixing the photointerrupters 46 and 48 to the shaking correction portion 30 can be suppressed.

According to this embodiment, as hereinabove described, the support portion 36 is so provided with the L-shaped portion 36h constituted of the support wall surfaces 36f and 36g that the number of components can be reduced as compared with a case of providing the orthogonal support wall surfaces 36f and 36g independently of each other.

According to this embodiment, as hereinabove described, the L-shaped portion 36h is so integrally provided as to protrude from the support wall surface 36d frontward that the number of components can be reduced as compared with a case of providing the L-shaped portion 36h and the support wall surface 36d independently of each other.

According to this embodiment, as hereinabove described, the support portion 36c is provided with the projection 36j so provided as to protrude from the support wall surface 36d frontward and the photointerrupter 46 is so held between the support wall surface 36g and the projection 36j that the position thereof is controlled in the direction X, whereby the photointerrupter 46 can be inhibited from moving in the direction X.

According to this embodiment, as hereinabove described, the projection 36j of the support portion 36c is so formed as to come into contact with the FPC 47 and the portion in contact with the FPC 47 is rounded, whereby the FPC 47 can be prevented from damage even if the FPC 47 comes into contact with the projection 36j when the photointerrupter 46 is mounted on the support portion 36c.

According to this embodiment, as hereinabove described, the support portion 36c is provided with the projection 36i so provided as to protrude from the support wall surface 36d frontward and the photointerrupter 46 is so held between the support wall surface 36f and the projection 36i that the position thereof is controlled in the direction Y, whereby the photointerrupter 46 can be inhibited from moving in the direction Y.

According to this embodiment, as hereinabove described, the video camera 1 is provided with the support portion 36c integrally provided on the fixed stage 36 for supporting the photointerrupter 46 and the support portion 39e integrally provided on the Y stage 39 for supporting the photointerrupter 48, whereby the number of components can be reduced as compared with a case of providing the support portion 36c and the fixed stage 36 independently of each other and a case of providing the support portion 39e and the Y stage 39 independently of each other.

According to this embodiment, as hereinabove described, the photointerrupter 46 supported by the support portion 36c is held between the support wall surface 36d of the support portion 36c and the protrusion 20a integrally provided on the lens cover 20 while the photointerrupter 48 supported by the support portion 39e is held between the support wall surface 39f of the support portion 39e and the lens cover 20, whereby both of the photointerrupters 46 and 48 supported by the support portions 36c and 39e respectively can be held between the single lens cover 20 and the support wall surfaces 36d and 39f of the support portions 36c and 39e.

According to this embodiment, as hereinabove described, the photointerrupter 46 is provided with the detective recess portion 46a detecting the sensor piece 39d received from the open portion 36k and the projection 36i is so arranged on the position avoiding the detective recess portion 46a of the photointerrupter 46 as not to interfere with the moving sensor piece 39d, whereby the projection 36i controlling the position of the photointerrupter 46 in the direction Y can be so formed as not to interfere with the sensor piece 39d entering the detective recess portion 46a of the photointerrupter 46 from the open portion 36k of the support portion 36c.

According to this embodiment, as hereinabove described, the FPC 47 has the sensor mounting portion 46a mounted with the photointerrupter 46 and the bent portion 46b located in the vicinity of the sensor mounting portion 46a and is so formed as to generate the urging force toward the support wall surfaces 36f and 36g due to torque directed toward the direction P on the basis of the bent portion 46b, whereby the FPC 47 can easily generate the urging force toward the directions of the support wall surfaces 36f and 36g.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the video camera 1 employed as an exemplary image sensor, the present invention is not restricted to this but is also applicable to an image sensor other than the video camera, so far as the image sensor comprises an optical sensor and a moving sensor piece.

While the transmission photointerrupters 46 and 48 are employed as exemplary optical sensors in the aforementioned embodiment, the present invention is not restricted to this but another optical sensor such as a reflection photointerrupter may alternatively be employed.

While the CCD 31 is employed as the exemplary imaging element in the aforementioned embodiment, the present invention is not restricted to this but another imaging element such as a CMOS (complementary metal oxide semiconductor) device may alternatively be employed.

What is claimed is:

1. An image sensor comprising:
an optical sensor;
a flexible wiring board, having a sensor connecting portion connected with said optical sensor while supplying power to said optical sensor, bent around said sensor connecting portion and so formed as to generate urging force oppositely to the bent direction on said sensor connecting portion; and
a support portion at least having a first support surface for supporting said optical sensor, wherein
said optical sensor is urged at least toward said first support surface of said support portion to be fixed thereto due to said urging force of said flexible wiring board arranged in the bent manner.

2. The image sensor according to claim 1, wherein
said support portion further includes a second support surface orthogonal to said first support surface, and
said optical sensor is urged not only in the direction of said first support surface but also in the direction of said second support surface due to said urging force of said sensor connecting portion of said flexible wiring board.

3. The image sensor according to claim 2, wherein
said support portion further includes a third support surface orthogonal to said first support surface and said second support surface,
the image sensor further comprises:
an imaging element imaging a subject,
a sensor body including said imaging element,
a shaking correction portion for sensing shaking of said sensor body and correcting said shaking,
a lens for incorporating light from the direction of said subject, and
a lens cover arranged between said lens and said shaking correction portion to be closer to said shaking correction portion, and
said optical sensor is held between said third support surface of said support portion and said lens cover.

4. The image sensor according to claim 3, wherein
said lens cover integrally includes a protrusion for holding said optical sensor between said lens cover and said third support surface of said support portion.

5. The image sensor according to claim 3, wherein
said shaking correction portion includes a movable portion for moving said imaging element,
said movable portion has a sensor piece,
said optical sensor is so formed as to detect the position of said movable portion by receiving said sensor piece, and
said support portion further includes a sensor piece receiving portion on a side opposed to said first support surface.

6. The image sensor according to claim 5, wherein
said shaking correction portion includes said movable portion and a fixed portion movably supporting said movable portion, and
said support portion is integrally provided on said fixed portion or said movable portion.

7. The image sensor according to claim 2, wherein
said support portion further includes an L-shaped portion constituted of said first support surface and said second support surface.

8. The image sensor according to claim 7, wherein
said support portion further integrally includes a third support surface orthogonal to said first support surface and said second support surface, and
said L-shaped portion is so integrally provided as to protrude from said third support surface frontward.

9. The image sensor according to claim 5, wherein
said support portion further includes a first projection so provided as to protrude from said third support surface frontward, and
said optical sensor is held between said second support surface and said first projection to be position-controlled in a direction orthogonal to the direction of movement of said sensor piece.

10. The image sensor according to claim 9, wherein
said first projection of said support portion is so formed that the surface closer to said flexible wiring board is rounded.

11. The image sensor according to claim 9, wherein
said optical sensor includes a plurality of terminal portions so provided as to protrude from said flexible wiring board, and
said first projection of said support portion is arranged between said plurality of terminal portions.

12. The image sensor according to claim 5, wherein
said support portion further includes a second projection so provided as to protrude from said third support surface frontward, and
said optical sensor is held between said first support surface and said second projection to be position-controlled in a direction along the direction of movement of said sensor piece.

13. The image sensor according to claim 6, wherein
said support portion includes a first support portion integrally provided on said fixed portion and a second support portion integrally provided on said movable portion, and
said optical sensor includes a first optical sensor and a second optical sensor supported by said first support portion and said second support portion respectively, and said first optical sensor and said second optical sensor are so formed as to detect the positions of said movable portion in directions X and Y orthogonal to each other.

14. The image sensor according to claim 13, wherein
said first optical sensor supported by said first support portion is held between a third support surface of said first support portion and a protrusion integrally provided on said lens cover, and
said second optical sensor supported by said second support portion is held between a third support surface of said second support portion and said lens cover.

15. The image sensor according to claim 13, wherein
said fixed portion and said movable portion of said shaking correction portion have rectangular frame shapes,
said first support portion is arranged in the vicinity of a corner of said fixed portion, and
said second support portion is arranged in the vicinity of a corner of said movable portion.

16. The image sensor according to claim 5, wherein
said support portion further includes a second projection so provided as to protrude from said third support surface frontward,
said optical sensor includes a detective recess portion detecting said sensor piece by receiving said sensor piece from said sensor piece receiving portion, and
said second projection is so arranged as to hold said optical sensor between said second projection and said first support surface on a position so avoiding said detective recess portion of said optical sensor as not to interfere with moving said sensor piece.

17. The image sensor according to claim 2, wherein
said flexible wiring board has a sensor mounting portion mounted with said optical sensor and a bent portion located in the vicinity of said sensor mounting portion, and is so formed as to generate urging force toward the directions of said first support surface and said second support surface by torque directed toward directions X and Y orthogonal to each other on the basis of said bent portion.

18. An image sensor comprising:
an imaging element imaging a subject;
an X-Y stage moving said imaging element in directions X and Y orthogonal to each other;
a Y stage supporting said X-Y stage to be movable in said direction X;
a fixed stage supporting said Y stage to be movable in said direction Y;
a first optical sensor for detecting a reference position of said Y stage in said direction Y;
a second optical sensor for detecting a reference position of said X-Y stage in said direction X;
a first support portion having an L-shaped first support wall surface for supporting said first optical sensor;
a second support portion having an L-shaped second support wall surface for supporting said second optical sensor;
a first flexible wiring board connected with said first optical sensor, bent around the portion connected with said first optical sensor and so formed as to generate urging force oppositely to the bent direction; and
a second flexible wiring board connected with said second optical sensor, bent around the portion connected with said second optical sensor and so formed as to generate urging force oppositely to the bent direction, wherein
said first optical sensor is urged toward at least said L-shaped first support wall surface of said first support portion to be fixed thereto due to said urging force of said first flexible wiring board arranged in the bent manner, and
said second optical sensor is urged toward at least said L-shaped second support wall surface of said second support portion to be fixed thereto due to said urging force of said second flexible wiring board arranged in the bent manner.

* * * * *